INVENTOR
PATRICK R. J. COURT
BY
Norman J. O'Malley
ATTORNEY

INVENTOR
PATRICK R.J. COURT
BY
Norman J. O'Malley
ATTORNEY

INVENTOR
PATRICK R. J. COURT
BY
Norman J. O'Malley
ATTORNEY

United States Patent Office 2,953,634

Patented Sept. 20, 1960

2,953,634

COLOR TELEVISION RECEIVER

Patrick R. J. Court, Buffalo, N.Y., assignor, by mesne assignments, to Sylvania Electric Products Inc., Wilmington, Del., a corporation of Delaware Filed July 19, 1955, Ser. No. 522,969

8 Claims. (Cl. 178—5.4)

Figure 1:
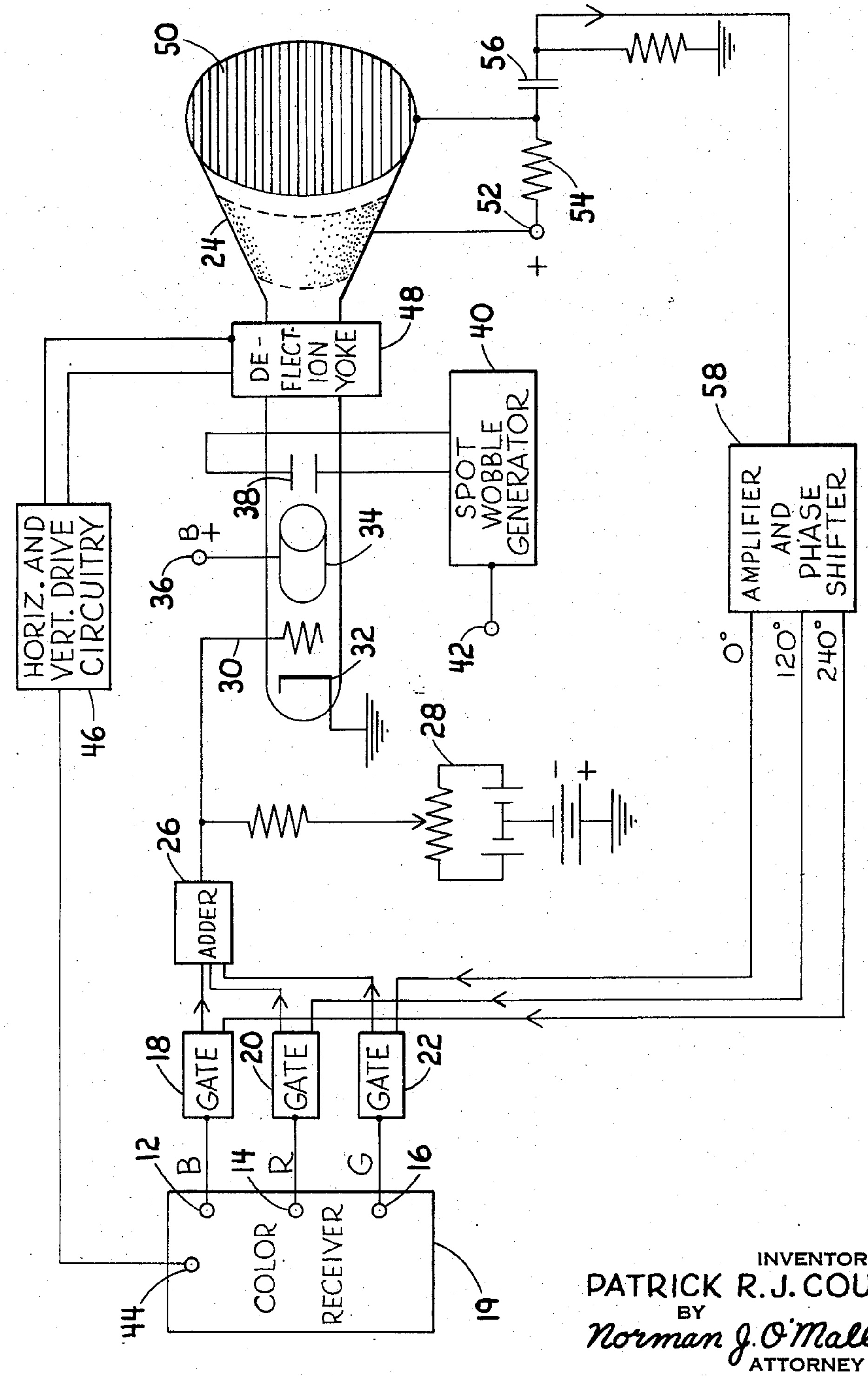

This invention relates, in general, to television receivers and more specifically, to color television receivers of the indexing type.

Color image display devices, presently being considered by the industry, generally provide an image screen surface comprising a plurality of distinct, minute color phosphor areas in dot or line form. When the display writing beam impinges on a minute screen area selected to fluoresce and emit light of a given primary color, the signal information carried at that instant by the writing beam must be primarily limited to the correct chroma component associated with the given primary color. Thus, absent means for masking each screen area from beam portions carrying non-related chroma information, it is necessary to coordinate writing beam position at the screen with chroma information carried by the writing beam.

The prior art structures which attempt to coordinate signal chroma information with the display beam position generally involve a display screen comprising a plurality of parallel vertically extending phosphor strips grouped in a repeating sequence of color triads. Thus, as the writing beam is scanned horizontally across the screen surface, the beam impinges first on a phosphor strip emitting light of one color, e.g., red, next on a phosphor strip which emits light of a second primary color, e.g., blue, and then on a phosphor strip emitting light of a third primary color, e.g., green. This triad strip sequence may be selected as desired but once fixed for the first color triad the same sequence is repeated in each triad across the complete screen area. In addition, means are included for producing an indexing signal indicative of instantaneous beam position relative to a selected phosphor strip in each color triad. In general, the indexing signal usually produced can be considered to be a plurality of voltage pulses, each pulse of which reaches a peak at the instant the writing beam impinges on a given color phosphor strip in each triad or on an area of fixed relationship with each triad.

Indexing information may be recovered by any one of several methods, including photo cell or photo tube type pick ups, as well as probes or electrodes mounted within the display envelope. Regardless of the pick up structure used, amplification of the indexing signal appears to be essential and in order to limit the information which is amplified solely to the desired indexing information, it has been considered necessary to limit the band width of the indexing signal amplifier.

The major limiting factor in such systems is the inherent delay time around the indexing signal loop through the relatively narrow band indexing signal amplifier, i.e., the circuit loop between the indexing signal pick up or sensing device and the coordinated circuit. In present systems, this delay time may be of the order of .75 microsecond which seriously limits the allowable indexing signal frequency deviation range and as a result it has been necessary to design the beam deflection circuitry so as to have exceptionally fine horizontal scan linearity, as well as essentially constant horizontal width. In present receivers, the coordination system fails to function effectively unless both the scan width and horizontal linearity are maintained within 1%. In addition, the high voltage supply must be regulated not only to help maintain the constant width requirement, but also to avoid defocusing of the extremely fine writing beam required.

These undesirable close tolerances required for horizontal scan linearity and width of the scanning raster have been recognized as being commercially impractical, however, the only solutions taught by the prior art shift the tolerance requirements to some other critical circuit factor rather than to eliminate them entirely. For example, one answer suggested, provides an image display using a screen comprising parallel phosphor strips horizontally extending rather than vertically extending. This type of image screen requires additional deflection circuitry for wobbling the writing beam vertically across the color triads, at a rapid rate, while at the same time the writing beam is being deflected through its normal scanning pattern. The indexing signal produced by the wobbled beam is then amplified in a relatively narrow pass band amplifier and used to perfect and control vertical scan linearity. By thus using the index signal it is possible to relax otherwise tight tolerance requirements as far as horizontal scan linearity is concerned. Unfortunately, other tolerance requirements including vertical scan linearity and height are aggravated by this approach.

Thus, it is an object of this invention to provide an indexing type of color receiver which overcomes the above mentioned tolerance limitations and debilities.

It is a further object of this invention to provide an indexing type color receiver which operates with scanning circuitry having linearity tolerances similar to those presently accepted in black and white television receiver practice.

It is still another object of this invention to provide an indexing type color receiver which functions to anticipate writing beam position error at the image screen surface.

It is an additional object of this invention to provide an indexing type of color receiver which substantially coordinates signal color information and image writing beam position independently of the delay time in the indexing signal control circuit loop.

Briefly, one aspect of my invention comprises a color television receiver of the indexing signal type including a display device having an image screen comprising a series of parallel horizontally extending color phosphor triads with means for providing an indexing signal which is used to control presentation of chroma or color information to the writing beam.

Figure 2:
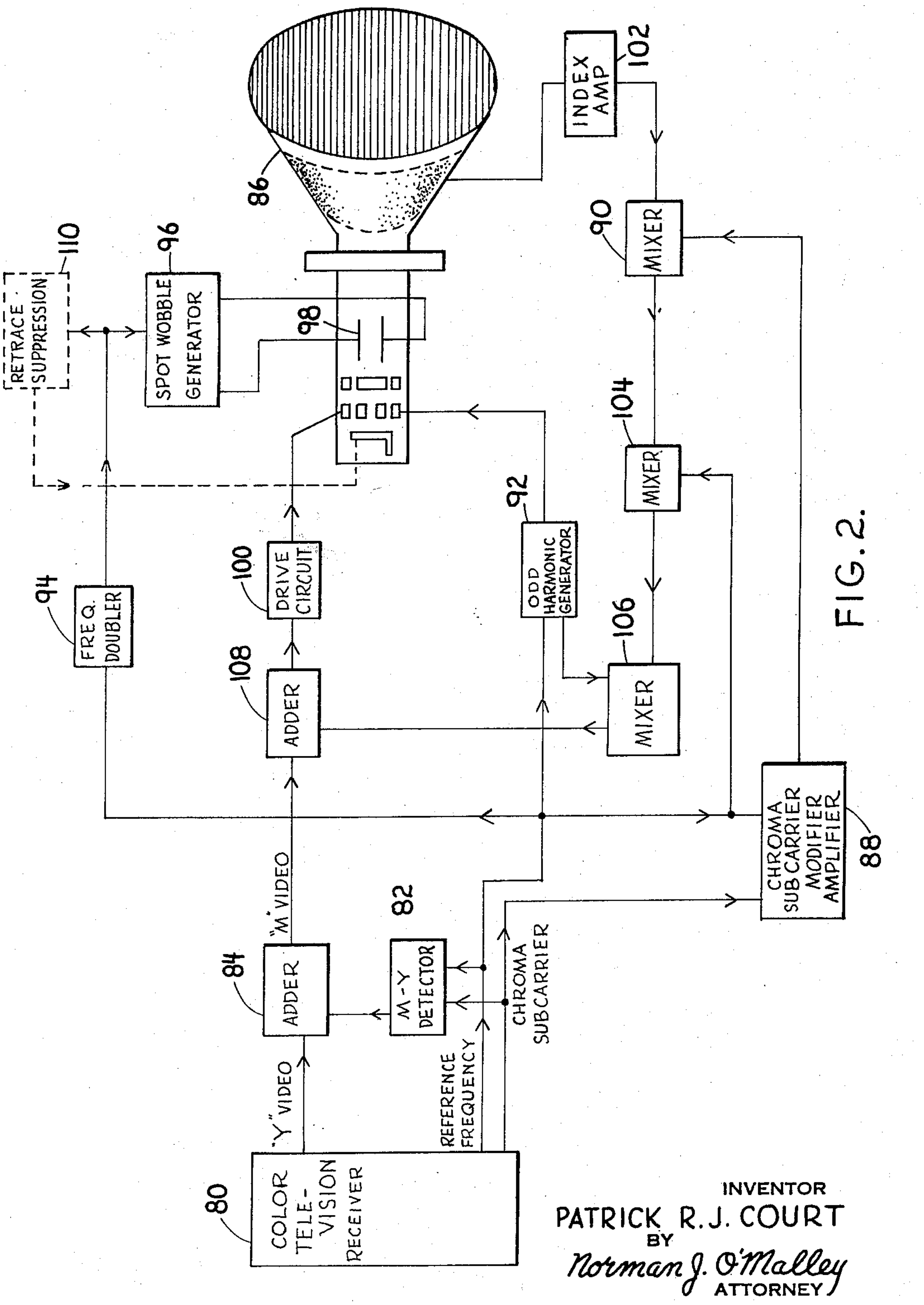
Figure 3:
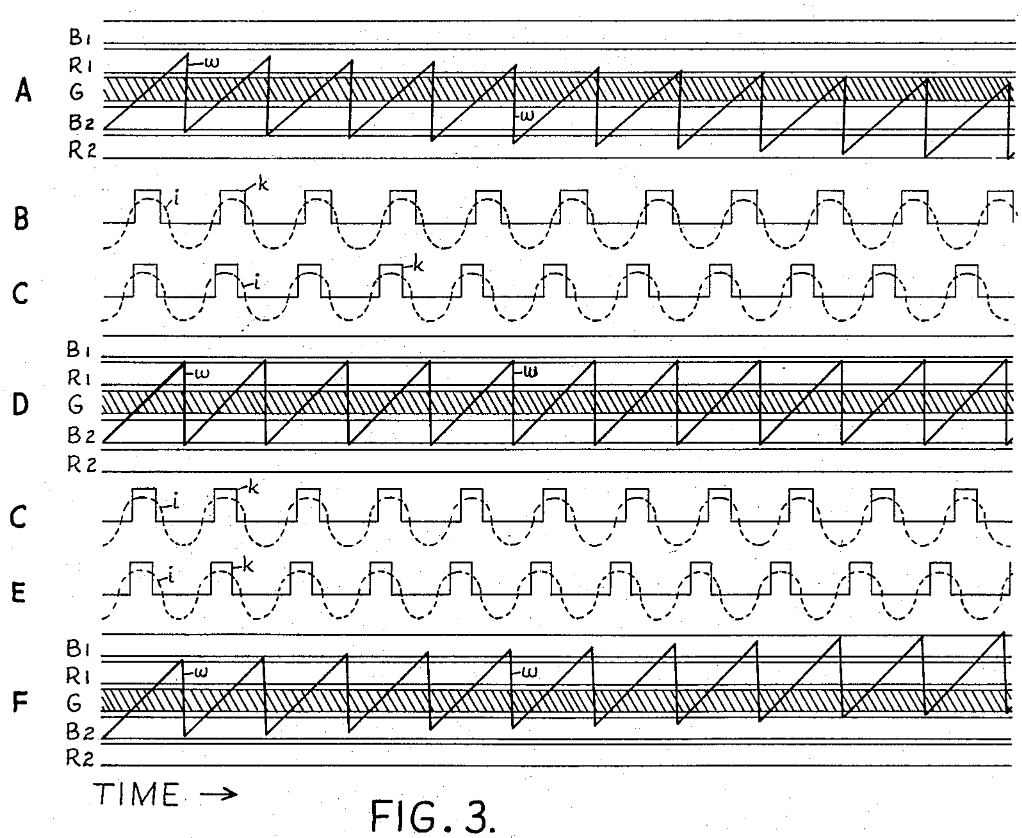
Figure 4:
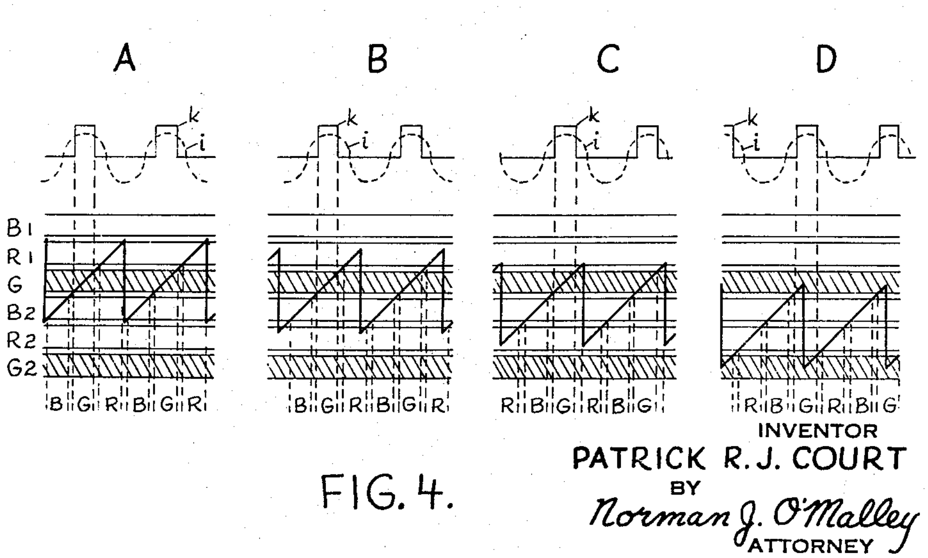

For a better understanding of this aspect of the invention, and the invention in general, together with other and further objects, advantages and capabilities thereof, reference is made to the following disclosure and the appended claims in connection with the accompanying drawings in which:

Fig. 1 shows one embodiment of the invention using a gated system for applying color information to the display, and Fig. 2 shows another embodiment of the invention using a heterodyning system for controlling presentation of signal chroma information to the display, and Fig. 3 and Fig. 4 are curves explaining operation of the embodiments shown in Figs. 1 and 2.

In the circuit embodiment of Fig. 1, I have shown portions of the circuit in block type schematic form. Though assembled in a novel combination, the individual circuit components, per se, are well known in the art.

In Fig. 1, I have provided terminals 12, 14 and 16 which are matrixed signal sources of blue, red and green color information supplied through a conventional color receiver 19 which conventionally includes a tuner, an intermediate amplifier strip, detectors, a sync separator and matrixing circuit. Gate circuits 18, 20 and 22 are respectively coupled to terminals 12, 14 and 16 and act as means for controlling the color information fed to the display device generally shown at 24. The output signals taken from gate circuits 18, 20 and 22, which includes the brightness components, are fed through adder circuit 26 where they are proportionately combined in accordance with transmitted signal specifications and display screen phosphor balance to form the image signal. The bias circuit shown generally at 28 may act as a brightness control over the resulting signal fed to grid 30 of display device 24.

Cathode 32 in display device 24 has been indicated in the drawing as providing a single electron stream in order to simplify circuit description. It is to be noted that the invention disclosed and claimed herein may use a display device having both a pilot electron stream and an image signal carrying electron stream which combine to make up the writing beam, and it is intended that the claims appended hereto shall not be construed as being limited solely to display devices having but a single internal electron stream. The remainder of the electron gun as shown generally at 34 in diagrammatic form is supplied from a source of B+ at terminal 36.

Though electromagnetic spot wobble deflection may be used, electrostatic deflection plates 38 are shown in the display envelope. The deflection voltage supplied to deflection plates 38 is provided by a spot wobble generator shown generally at 40. The input to the spot wobble generator is taken from a terminal 42 which may be an output of the conventional local 3.58 megacycle oscillator used in the receiver 19 to synchronously demodulate the received signal chroma information. Terminal 44 provides sync signals from a conventional sync separator circuit which may be included in the receiver 19 for synchronizing the horizontal and vertical drive circuitry shown generally at 46. The output of circuit 46 supplies deflection currents for deflection yoke 48.

The display image screen shown generally at 50 comprises a series of parallel phosphor strips, horizontally extending, arrayed in a repeating sequence of color phosphor triads. For purposes of explanation, a color triad can be considered to be provided for substantially each line element of the completed picture image and each color triad is made up of three separate color phosphor strips, each strip fluorescing to emit light of a separate primary color. As is well known, the primary colors selected are basically established by the specifications of the transmitted signal. It may comprise any colorimetric primaries capable of providing the desired display color gamut.

Assuming that the transmitted signal color primaries are selected to have a red, green and blue hue of a given saturation and brightness, each one of the display image screen color triad strips should be selected to fluoresce and emit light in accordance with the colorimetric coefficient of a separate selected primary. The arrangement or order in which the three color phosphors are laid down in each color triad is governed by a plurality of considerations unimportant here; however, once the order is selected for one triad, the same sequence is used in each triad across the complete image screen area.

Conventional means are also provided for producing an index signal indicative of writing beam position on the image screen at any given instant through the scanning cycle. One of the structures disclosed in the prior art utilizes a thin electron permeable light reflecting aluminum film coating on the electron gun side of the image screen phosphor layer upon which a series of secondary electron emissive strips are placed. Usually one secondary electron emissive strip is supplied for each color phosphor triad, being positioned directly over and in parallel with a given color phosphor strip. For example, some tubes presently used in the laboratory have the secondary emissive strip positioned over the green phosphor strip. It is immaterial, as far as the principle of my invention is concerned where the secondary emissive strips are positioned as long as they are placed to produce a signal indicative of writing beam position.

Terminal 52 may be considered as one terminal of a source of B+ potential, not shown, supplying a source of secondary anode voltage as well as a source of voltage for the indexing signal pick up device through isolating resistor 54. The indexing signal is taken from display device 24 and fed through coupling capacitor 56 to an amplifier and phase shifter 58 which in turn acts as a source of gating signals for gate circuits 18, 20 and 22.

Operation of the circuit embodiment, Fig. 1, can be best understood by reference to the curves shown in Fig. 3. Each of the figures, 3A, 3D and 3F, generally represent five parallel horizontally extending color phosphor strips of a typical display image screen. The triad sequence shown is red (R), green (G), and blue (B) with the indexing signal strip of secondary emissive material mounted over the green strip in each triad indicated by shading. Curves 3B, 3C and 3E, show the indexing signal as taken from the pick up device in idealized pulse wave form, while the dotted sine wave *i* superimposed on each pulse train *k* represents the filtered indexing signal after amplification through a relatively narrow pass band amplifier. As can be seen, the desired index signal sine wave has a frequency equal to the fundamental of the indexing pulse repetition frequency. The dotted saw-tooth or serrated waves W in Figs. 3A, 3D, and 3F represent the trace pattern of the writing beam generated in display 24 in Fig. 1 during a portion of a typical line scan. As will become apparent, the scan error shown in these Fig. 3 curves are exaggerated for purposes of explanation. Also, the scanning trace is not to be considered as limited to a saw-tooth wave form. Other wave shapes will readily occur to those skilled in the art.

Assuming that matrixed blue, red and green color signal components are supplied to terminals 12, 14 and 16 respectively, these signals are fed to gate circuit 18, 20 and 22 where they are passed to adder circuit 26 in accordance with the gating frequency. The resultant color image signal is then fed to grid 30 of display device 24 to modulate the image electron stream.

Though the spot wobble generator supplying spot wobble deflection voltages is usually supplied from a local oscillator operating at the color sub-carrier frequency or approximately 3.58 magacycles per second, the actual spot wobble frequency supplied to deflection plates 38 is preferably selected to be a harmonic of the color subcarrier frequency, e.g., the second harmonic or approximately 7.2 megacycles per second. Deflection yoke 48 which is supplied by normal deflection currents from horizontal and vertical drive circuitry 46 provides the normal scanning raster.

Referring now to Fig. 3A, it can be seen that the writing beam, represented by curve W, is wobbled so as to sweep across and along a given color triad on the display screen surface during each cycle of the spot wobble frequency. If it be assumed that raster shape is substantially perfect, the writing beam will trace out a pattern similar to that shown by curve W in Fig. 3D striking each phosphor strip in succession, red, blue, and green. When the writing beam crosses the secondary emissive strip superimposed upon the green phosphor strip, electrons are emitted which are picked up in pulse form by an internal electrode and fed through coupling capacitor 56, back to amplifier and phase shifter 58. The phase shifter portion of unit 58 then starts a train of three phase spaced equally timed pulses which are fed back to gate circuits 18, 20 and 22 to gate the chroma information in accordance with writing beam position information indicated by the indexing signal. As a result the blue information is modulated on the writing beam through the period when the blue strip is scanned; the green information is modulated on the writing beam during the period when the green strip is scanned; and the red information is modulated on the writing beam during the period when the red strip is scanned.

As has been stated, the curve Fig. 3D assumes that the raster shape is essentially perfect. In other words, this curve assumes that the resulting trace of the spot wobbled writing beam is kept within the bounds of a single color triad. In actual practice this is seldom the case in that some raster distortion is usually involved, such as shown in Fig. 3*a* in exaggerated form, to facilitate explanation. In Fig. 3*a* though the saw-tooth wave W starts out in one color triad, as it progresses across the line, it starts to encroach upon the color triad adjacent and below; yet, the color scan sequence remains the same as was shown in Fig. 3D. As the writing beam sweeps along the line, the red portion of the trace becomes divided between red strip R1 and red strip R2, until at the end of the trace all of the red light is being emitted from the red strip R1. As far as the resulting image is concerned, this change in red phosphor strips can not be seen at the normal viewing distance, since each color triad has such a small width, e.g., in a 21 inch picture tube each triad would be approximately .03 inch wide.

The required shift in phasing of the modulating image signal is brought about by a phase change in the indexing signal which can be seen by comparing curves, Fig. 3B and Fig. 3C. The pulse train *k* of Fig. 3B starts out almost the same, timewise, as pulse train *k* in Fig. 3C which is generated by an undistorted raster line trace. Then as the saw-tooth wave W starts to penetrate the phosphor strip R2, the writing beam crosses the shaded indexing strip at a different point on the slope of each saw-tooth cycle, shifting the resulting index pulse timewise. The shift in index signal pulse phase results in a phase shift in the indexing signal sine wave *i*. Thus, even though the writing beam through error caused by raster distortion, encroaches upon the area covered by red phosphor strip R2, the chroma information modulated on the writing beam is phase shifted so as to present red information while the writing beam is impinged upon either or both red phosphor strips R1 and R2; green information while the writing beam is impinged upon the green strip G; and blue information while the writing beam is impinged upon the blue phosphor strip B2. Both color sequence and phasing of the writing beam modulation signal remain correct.

Fig. 3F represents a condition of raster distortion causing the writing beam to progress into the adjacent and upper color triad as a given line is scanned. Reference to wave W in curve 3F shows that this type of error does not change the scanning color sequence, i.e., the color sequence still remains blue, green, red, blue, green, also, comparison of curves Fig. 3C and Fig. 3F indicates that the resulting index pulse phase shift is in the proper sense to control amplifier and phase shifter unit 58, so as to shift the phase and timing of the gating pulse sequence to properly gate color information fed through gate circuits 18, 20 and 22. Thus regardless of the direction of vertical trace error, either up or down, the resulting phase modification of the index signal occurs in the correct sense to coordinate color information and beam position.

The embodiment disclosed in Fig. 1 involves circuit complications which may be eliminated by using a heterodyning process such as that shown in the embodiment of Fig. 2. Since the individual circuit elements, per se, are well known in the prior art, novelty residing in the combination involved, I have shown the embodiment of Fig. 2, in diagrammatic block form.

Though not absolutely essential, it has been found desirable to process the color television signal, standardized by the Federal Communications Commission in order to provide a signal of the so-called "dot-sequential" form for application to a single gun type of display. Such a dot-sequential signal wave form can be generally characterized as a color television signal including a monochrome component synthesized by substantially equal contributions of red, blue and green signals and a color sub-carrier signal which may be resolved into a symmetrical or equi-angle set of chroma vector components, one vector representing red, one vector representing blue, and one vector representing green chroma information. The relationship between the dot-sequential form of color television signal and the Federal Communications Commission standarized form is brought out in an article by B. D. Loughlin in "Proceedings of the Institute of Radio Engineers," January 1954, volume 42, pages 299 through 308. As is brought out in the Loughlin article, the luminance component Y of the standardized signal may be modified to a brightness component M of the dot-sequential signal form and the standardized signal chroma sub-carrier also processed to provide an equi-angle chromo sub-carrier of dot-sequential form. For further information concerning the equations and processes involved, reference should be made to the Loughlin article.

In the Fig. 2 embodiment, a color television receiver 80 is provided for receiving and demodulating a standard color television signal providing a luminance component Y, a source of reference signals which may be considered to be at the sub-carrier frequency or substantially 3.58 megacycles per second, and a chroma sub-carrier signal. M–Y detector 82, in which the chroma sub-carrier and reference signal are combined, produces an M–Y signal, which when added to the Y signal in adder 84, provides a dot-sequential M or brightness signal suitable for application to the intensity control grid of the display 86. The chroma sub-carrier modifying amplifier 88, which may be similar to the structures discussed in the Loughlin article, provides an equi-angle chroma sub-carrier signal which is fed to mixer circuit 90. Harmonic generator 92 is supplied by a source of reference frequency signals, i.e., 3.58 megacycles per second, to produce an output frequency which is an odd harmonic of the input frequency, e.g., the eleventh harmonic or 39.1 megacycles per second. Frequency doubler 94 is also supplied from the receiver 80 source of reference frequency signals and if, as assumed for the purposes of explanation here, the reference frequency is approximately 3.58 megacycles per second, the output of the frequency doubler provides the spot wobble generator 96 with a signal at substantially 7.2 megacycles per second. The spot wobble generator 96 can be considered, for purposes of explanation, to produce a saw-tooth wave at the frequency of the signal supplied from frequency doubler 94 which may be supplied to deflection plates 98 in display device 86.

The writing beam in display device 86 includes two electron streams, one of which is modulated by the pilot frequency signal supplied from generator 92 and the other of which is modulated by the image signal supplied from drive circuit 100. Both of these electron streams are wobbled by the electrostatic deflection field established between the deflection plates 98.

The image screen in display device 86 is similar to the image screen shown and described in connection with display device 24 in Fig. 1, in that the color triads are horizontally extending and indexing strips or other means are provided within the tube for developing and recovering an indexing signal. Since the pilot electron stream is moved across the indexing strips at the spot wobble frequency, absent distortion errors, and assuming the pilot frequency is the eleventh harmonic of the reference frequency and the spot wobble frequency is the second harmonic of the reference frequency, it can be seen that the indexing signal may be selected as a side band having a mean frequency equal to the thirteenth harmonic of the reference frequency, which in the case described would be 46.5 megacycles per second. Raster distortion either adds or subtracts a number of cycles proportional to the phase error involved as has been explained in connection with the curves of Fig. 3.

The resulting indexing signal is coupled through index amplifier 102 to mixer 90 where it is mixed with the equi-angle chroma information supplied from chroma modifier 88. The output of the mixer 90 is fed to mixer 104 where it is combined with the reference frequency of 3.58 megacycles, resulting in an output signal wave at approximately 46.5 megacycles carrying the chroma information as an equi-angle vector plus phase information indicative of pilot stream position at the screen. In other words the output of mixer 104 can be considered as an equi-angle vector rotating at a frequency of approximately 46.5 megacycles which carries phase information indicative of any distortion error picked up by the indexing signal. The output of mixer 104 is fed to mixer 106 where it is heterodyned by the output of harmonic generator 92 which, as was stated, generates a signal having a frequency preferably equal to the eleventh harmonic of the reference frequency, or in this case approximately 39.1 megacycles per second. Thus the difference signal at the output of mixer 106 contains the chroma information carried on a signal having a frequency of 7.2 megacycles per second which shifts in phase and frequency in accordance with the index signal error information. This signal can be shown to be represented by a set of three equi-angle vectors, one being related to red, one being related to blue, and one being related to green signal information.

The output of mixer 106 is fed to added 108 where it is combined with the previously described M or brightness signal and fed to drive circuit 100 to modulate the image electron stream component of the writing beam.

Thus, the heteodyning process involved in the circuit of Fig. 2 presents an equi-angle color signal to the image stream component of the writing beam at such frequency as to cause the red component of the image stream to impinge on the screen at the instant when the writing beam strikes a red phosphor, and if any coordination or phase error appears, the resulting shift in the indexing signal phase changes the phase of the red vector in such a direction as to compensate and maintain coordination between the writing beam and the instantaneous beam position at the image screen. When the image stream impinges on a blue or green phosphor strip the image information carried by the image stream is likewise appropriate and any shift caused by a distorted relationship between the raster and the image screen shows up in the indexing signal to shift the phase of the image information appropriately.

The resulting action can be best seen by referring to the curves of Fig. 4, which are similar to the curves of Fig. 3. Each of curves Fig. 4A, 4B, 4C and 4D can be considered to be minute portions of a single typical line trace appearing at various positions across the image screen. Assuming that the trace starts out as in Fig. 4A perfectly centered over a color triad, it can be seen that the color sequence is blue, green, red and blue. If, as the trace moves across the screen, through raster distortion or some other cause, the beam starts to progress into the adjacent and lower color triad as shown in Fig. 4B, though there is no change in the color sequence, it is to be noted that there is a slight phase shift in the index pulse *k* resulting in an equal phase shift in the sine wave *i* or filtered version of pulse *k*. Referring to curve Fig. 4C, it can be seen that the continuing error still produces the same color sequence and continues to modify the relative phase position of pulse *k*. Finally as the trace reaches the opposite side of the screen and becomes centered between the two index strips, though the phase of the index signal is clearly modified, the color sequence remains the same as was shown in Fig. 4A.

Though I have shown the odd harmonic generator 92 as being supplied from the reference frequency source of 3.58 megacycles and the frequency doubler 94 also as being supplied by the reference frequency source, it is to be understood that elements 92 and 94 may comprise individual oscillators of very stable form operating relatively independent of each other. In the specific embodiment herein described the pilot frequency of 39.1 megacycles has been selected so that the sum or difference frequencies involved fall midway between two harmonics of the spot wobble frequency. Though this selection is obviously preferable in order to avoid undesirable beat patterns which might occur, I do not intend that the claims set forth herein shall be limited to these specific values. The suggested pilot frequency has proved to be acceptable; however, it is not unlikely that other values may occur to those skilled in the art which have advantages in the specific receiver involved.

As for the spot wobble frequency selected, the frequency of 7.2 megacycles per second was selected because of advantages resulting in possible image fidelity. Though the use of a 3.58 megacycle spot wobble frequency might be acceptable in a receiver where the brightness definition is not important, where a brightness definition up to approximately 3.5 megacycles is desired, the spot wobble frequency should be at least 7.2 megacycles per second.

I have shown a retrace suppression element 110 fed from frequency doubler 94 which may be useful in cases where retrace suppression is desired. For example, referring to the curves of Fig. 3 and Fig. 4, it can be seen that the spot wobble saw-tooth wave shown there is in idealized form, with little or no retrace time being involved. If for some reason a spot wobble deflection having appreciable retrace period is commercially desirable, retrace suppression element 110 may be provided to suppress the spot wobble retrace portion of the writing beam.

The present concept in using an entirely novel approach of allowing the scan to slip or creep between color phosphor triads, within limits, essentially avoids tight tolerance limitations relating to vertical and horizontal scan linearity width and height, and even though it becomes necessary to pay attention to raster distortion, the tolerance limitation involved are well within the scope used in commercially available black and white television receivers.

There is one additional advantage to my concept, not heretofore considered which involves the spacing of the pilot electron stream from the image writing stream in order to compensate for inherent delay periods around the index signal coordination loop. Referring back to the curves of Fig. 4, it can be seen that if the pilot electron stream is spaced slightly ahead of the image electron stream, the resulting phase error transmitted to the index signal will anticipate the position of the ultimate image electron stream at a given instant. For example in a 21 inch tube, by spacing the pilot electron stream approximately a quarter of an inch ahead of the electron stream it can be shown that this anticipation period approximately equals the inherent delay period around the index signal loop. Thus, distortion of the image raster causing trace error tends to be anticipated so as to shift the phase of the heterodyned input signal, approximately at the instant the writing beam arrives at its desired position on the image screen.

Though the term chroma has been used herein primarily to refer to hue and saturation components of the transmitted color signal, it is recognized that the standard color television signal as approved by the Federal Communications Commission, at least when gamma corrected at the transmitter, does not completely isolate brightness information from the so called chroma information. Thus, some hue and saturation information may be present in the received brightness signal component and some brightness information may be included in the received chroma signal component.

Although there has been shown and described what is at present considered the preferred embodiments of my invention, it will be obvious to those skilled in the art that various changes and modifications may be made therein without departing from the invention as defined by the appended claims.

What is claimed is:

1. In a television receiver the combination comprising a source of television signals having time related color hue information components; an image screen comprising a plurality of horizontally extending fluorescent color light emitting phosphor strips arranged in a repeating color triad sequence; means for providing a modulatable writing beam; means for deflecting said writing beam across said screen in a series of raster lines generally parallel to the phosphor screen strips; means for cyclically deflecting said beam across said phosphor strips at a given rate during each line scan; means for extracting beam position information at the screen; means coupling said television signals to modulate at least a portion of said writing beam; and means utilizing said beam position information for modifying the writing beam color hue information components with respect to time to bring each color hue tagged portion of the writing beam substantially in registry with phosphor strips emitting light of the respective hue.

2. In a television receiver the combination comprising a source of television signals having time related chroma components; an image screen comprising a plurality of horizontally extending fluorescent color light emitting phosphor strips arranged in a repeating color triad sequence and a horizontally disposed indexing strip positioned adjacent each triad; means for providing a modulatable writing beam; means for deflecting said writing beam across said screen in a series of raster lines varying between parallel and generally parallel to the phosphor screen strips; means for cyclically wobbling said beam across said phosphor strips at a given rate during each line scan, the peak to peak amplitude swing of the cross strip deflection being an integral multiple of the index strip spacing; means for extracting position information generated by said writing beam crossing said index strips; means coupling said television signals to modulate at least a portion of said writing beam; and means utilizing said beam position information for modifying the electron beam chroma information components with respect to time to bring each color hue tagged portion of the writing beam substantially in registry with phosphor strips emitting light of the respective hue.

3. In a television receiver the combination comprising a source of color television signals having phase related chroma information components; an image screen comprising a plurality of horizontally extending fluorescent color light emitting phosphor strips arranged in a repeating color triad sequence and a horizontally disposed indexing strip associated with each triad; means for providing a modulatable writing beam; means for deflecting said writing beam across said screen in a series of raster lines generally parallel to the phosphor screen strips; means for cyclically deflecting said beam across said phosphor strips at a given rate during each line scan, the peak to peak amplitude swing of the cross strip deflection being an integral multiple of the index strip vertical spacing; means for extracting anticipatory position information generated by a portion of said writing beam crossing said index strips; means coupling said color television signals to modulate at least a portion of said electron beam; and means utilizing said beam position information for phase modifying the writing beam color hue information components to bring each color hue tagged portion of the writing beam substantially in registry with the phosphor strips emitting light of the respective hue.

4. In a television receiver the combination comprising a source of television signals having time phase related color hue information components; an image screen comprising a plurality of horizontally extending fluorescent color light emitting phosphor strips arranged in a repeating color triad sequence and a horizontally disposed indexing strip associated with each triad; means for providing a modulatable writing beam comprising an image stream and a pilot stream being spaced apart from and horizontally leading said image stream; means for deflecting said writing beam across said screen in a series of raster lines varying between parallel and generally parallel phosphor screen strips; means for cyclically deflecting said beam across said phosphor strips at a given rate during each line scan, the peak to peak amplitude swing of the cross strip deflection being an integral multiple of the index strip spacing; means for extracting position information generated by the pilot stream crossing said index strips; means coupling said television signals to modulate said image stream, and means utilizing said beam position information for modifying the electron beam color hue information components with respect to time phase to bring each color hue tagged portion of the image stream substantially in registry with phosphor strips emitting light of the respective hue.

5. In a color television receiver the combination comprising a source of color television signals having three separate primary color components; a display device having an image screen comprising a plurality of horizontally extending phosphor strip triads, each of the three transmission primary colors being represented by a separate phosphor strip in each triad; means for providing a writing beam deflectably impinged on the display image screen; a source of signal information continuously indicative of the position of writing beam impingement on the image screen; means for deflecting the writing beam across the image screen in a series of raster line traces substantially parallel to the phosphor screen strips, each line trace including a plurality of vertical component traces having an amplitude substantially equal to an integral multiple of the width of a phosphor triad; means for modulating the writing beam; gating means coupled between said modulating means and said source of color television signals; and means coupling the output of said source of signal information to control said gating means in accordance with writing beam position on the image screen.

6. In a color television receiver the combination comprising source of color television signals having three separate primary color components; a display device having an image screen comprising a plurality of horizontally extending phosphor strip triads, each of the three transmission primary colors being represented by a separate phosphor strip in each triad; an index strip associated with each screen triad; means for providing a writing beam deflectably impinged on the display image screen; means for deflecting the writing beam across the image screen in a series of raster line traces substantially parallel to the phosphor screen strips, each line trace including a plurality of vertical component traces having an amplitude substantially equal to an integral multiple of the width of a phosphor triad; a source of signal information continuously indicative of the position of writing beam impingement on the image screen index strips; means for modulating the writing beam; gating means coupled between said modulating means and said source of color television signals; and means coupling the output of said source of signal information to control said gating means in accordance with writing beam position on the image screen.

7. In a color television receiver the combination comprising an image display having a deflectable image stream and an image screen of horizontally extending phosphor strip triads, each triad including a separate phosphor strip for each image signal primary color to be reproduced; a source of color television image signals having a brightness or monochrome component and a chroma component, said chroma component carrying phase related image hue and saturation components; means deflecting said image stream across the image screen in a horizontal raster of line traces, each horizontal line trace including a plurality of cyclic vertical trace components each having an amplitude substantially equal to the width of an integral number of phosphor strip triads; means for providing a source of signals continuously indicative of image stream position on the image screen; means for modulating said image stream with said television image signals; and means for controlling the phase position of image hue and saturation components of said color television signals coupled to said modulating means with signals supplied from the source of beam position information signals.

8. In a television receiver the combination comprising a source of television signals having time related color hue information components; an image screen comprising a plurality of horizontally extending color light emitting strips arranged in a repeating color triad sequence; means for providing a modulatable writing beam; means for deflecting said writing beam across said screen in a series of raster lines generally parallel to the screen strips; means for cyclically deflecting said beam across said screen strips at a given rate during each line scan; means for extracting beam position information at the screen; means coupling said television signals to modulate at least a portion of said writing beam; and means utilizing said beam position information for modifying the writing beam color hue information components with respect to time to bring each color hue tagged portion of the writing beam substantially in registry with screen strips emitting light of the respective hue.

References Cited in the file of this patent

UNITED STATES PATENTS

| | | |
|---|---|---|
| 2,634,326 | Goodrich | Apr. 7, 1953 |
| 2,644,855 | Bradley | July 7, 1953 |
| 2,671,129 | Moore | Mar. 2, 1954 |
| 2,713,605 | Bradley | July 19, 1955 |
| 2,736,764 | Bingley | Feb. 28, 1956 |
| 2,771,503 | Schwartz | Nov. 20, 1956 |
| 2,771,504 | Moore | Nov. 20, 1956 |
| 2,773,117 | Clapp | Dec. 4, 1956 |
| 2,773,118 | Moore | Dec. 4, 1956 |
| 2,777,010 | Bradley | Jan. 8, 1957 |